United States Patent
Mueller

[15] 3,653,639
[45] Apr. 4, 1972

[54] HIGH PRESSURE AIR AND LIQUID BLENDING METHOD AND APPARATUS FOR DISCRETE MATERIALS

[72] Inventor: Marvin C. Mueller, Lesueur, Minn.
[73] Assignee: Whirl-Air-Flow Corporation, Minneapolis, Minn.
[22] Filed: Feb. 4, 1971
[21] Appl. No.: 112,568

[52] U.S. Cl. .................................................259/4, 259/36
[51] Int. Cl. ..............................................................B01f 15/02
[58] Field of Search ....................259/4, DIG. 17, 95, 18, 36, 259/60

[56] References Cited

UNITED STATES PATENTS

| | | |
|---|---|---|
| 2,292,897 | 8/1942 | Nielsen.........................................259/4 |
| 2,609,185 | 9/1952 | Eisner............................259/DIG. 17 |
| 2,665,035 | 1/1954 | Schemm.....................................259/4 |
| 2,723,838 | 11/1955 | Peters..........................................259/4 |

Primary Examiner—Robert W. Jenkins
Attorney—Merchant & Gould

[57] ABSTRACT

A closable vessel is shown having a funnel-shaped lower portion with an outlet opening at the bottom end. Aerator pads and air jet fittings are mounted on the inner wall of the lower portion to fluidize and blend discrete materials in the vessel. A water spray nozzle is mounted within the vessel near the center thereof to spray a predetermined amount of water into the discrete materials during the blending cycle. A diffuser pad is mounted at the outlet opening to aid in fluidizing the materials during blending and to aid in causing the blended materials to flow from the vessel into an outlet conduit for transporting to a remote location.

7 Claims, 1 Drawing Figure

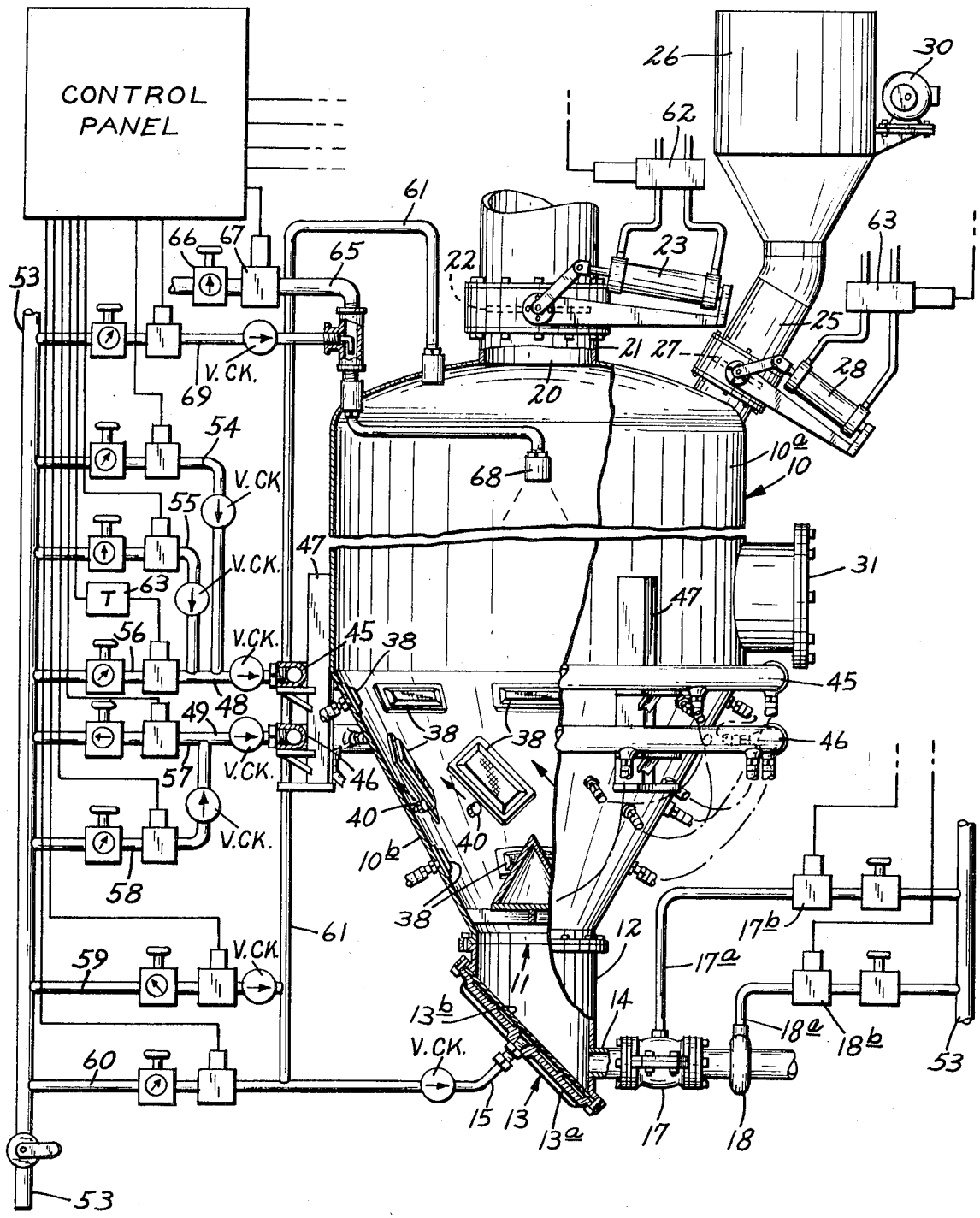

HIGH PRESSURE AIR AND LIQUID BLENDING METHOD AND APPARATUS FOR DISCRETE MATERIALS

BACKGROUND OF THE INVENTION

1. FIELD OF THE INVENTION

This invention relates generally to the art of fluidizing, blending and transporting discrete materials and more particularly relates to novel apparatus and structure for adding liquid to such materials during the blending cycle.

2. DESCRIPTION OF THE PRIOR ART

This invention is an improvement to the method and apparatus disclosed in the Edward E. Mueller and Marvin C. Mueller U.S. Pat. application, Ser. No. 825,006, filed May 15, 1969, now U.S. Pat. No. 3,582,046. There, the material to be mixed was placed in a tank and subjected to low pressure air to fluidize the whole mass of material. It was then subjected to pulsating high pressure air jets to blend the material. After the blending was completed, the pulsations were discontinued, and the blended, still fluidized mass was removed from the tank through a bottom opening and, by means of a diffuser pad, caused to flow through a transport conduit to a remote location. Low pressure air was used to fluidize the whole mass of material, and pulsed high pressure air was used to stir, agitate and mix the fluidized mass during the blending cycle. After the blending cycle was completed, medium air pressure was used to fluidize and transport the material to a remote location.

Those working in the art had recognized that it would be desirable in many situations to add water or other liquid to the batch. One purpose of adding liquid is to control dust. Dust escaping from the batch during the blending cycle is a nuisance and a pollution problem. A better process also results if the smaller particles are retained in the mix. Another reason for adding liquid to the batch or mix is that it helps in preventing the mix from segregating during transport and storage. It has also been recognized that it is easier to transport some mixes when they are damp.

Another advantage of adding water or other liquid to the batch is found in the glass making and foundry industry, where the many different elements going into a glass batch are mixed together into a homogeneous mass prior to being mixed with sand in the final processing. One of the important elements included in the batch is bentonite (clay). If water is added to the batch during blending, it will preactivate the clay and reduce the amount of clay needed in the batch. This pre-slaking of the clay can reduce clay requirements by 10–20 percent as compared to a dry mix.

The problem in the past has been the difficulty of obtaining even dispersion of the water into the mix. If water is added too quickly or if too much is added in one spot, a clay ball will from in the vessel during blending. If the water makes contact with the walls of the blending vessel, material will stick to the walls. For these and other reasons, prior art systems have been unable to uniformly distribute liquid to the mix.

SUMMARY OF THE INVENTION

The present invention provides a reliable and effective means of adding liquid to a mass of discrete materials without forming clay balls in the vessel or caking the inner walls of the vessel with wet material. A liquid spray nozzle is mounted within the vessel near the center thereof to provide a very fine liquid spray, like a fog, into the discrete materials during the blending cycle. The liquid, usually water, is provided at a constant pressure, usually between 40 and 45 psig, in order to permit regulation of volume by timing the spray. The spray is activated only after the blending cycle has started and its deactivated before the blending cycle is completed. This insures even distribution of the liquid directly into the agitated materials and avoids liquid contact with the inner walls of the vessel. The amount of liquid to be added is based upon the type of materials being mixed and the size of the batch. Although water is normally used, other liquids can also be used in certain situations. For example, sodium hydroxide can be used with a glass batch. With some mixes such as a glass batch, a wetting agent can be added to reduce the amount of liquid that is required. As an example and not as a limitation, I have found it possible to add up to 12 percent moisture to a batch. The result of my invention is better dust control, reduction of mix segregation during transport and storage, easier transporting of some mixes, and preactivation of certain elements in some mixes.

BRIEF DESCRIPTION OF THE DRAWING

The single FIGURE of the drawing is a view in side elevation of the blending, treating and transporting apparatus of my invention, including a schematic representation of a control system therefor, portions of the system being broken away and portions being shown in section.

DESCRIPTION OF THE PREFERRED EMBODIMENT

Because the present invention is an improvement over the invention of the previously identified Mueller et al. application, it was not considered necessary to show detailed drawings of certain elements such as the aerator pads, jet nozzles, diffuser pad and filter system. The details of such structures are shown in the previously identified Mueller et al. application and are incorporated herein by reference. Referring now to the drawing, a pressure vessel or tank 10 is shown having a cylindrical upper portion 10a and a generally conical lower portion 10b converging downwardly from the upper portion to a circular material outlet opening 11 at the bottom end thereof. Securely attached to lower portion 10b around opening 11 is a tubular member 12 having a diffuser pad 13 bolted to its lower end. Diffuser pad 13 is mounted at approximately a 45° angle with respect to the horizontal, and faces a material outlet conduit 14 mounted in the wall of tubular member 12.

Diffuser pad 13 has a support plate 13a with a center opening to which is secured an air supply conduit 15. The inner face of support plate 13a is provided with a series of raised ridges and a canvas or other porous material 13b is stretched tightly thereacross and secured around its edges as shown.

Material outlet conduit 14 is provided with a shut-off valve 17, and downstream therefrom a booster 18. Valve 17 is an air motor operated by air supplied through conduit 17a, having a solenoid control valve 17b therein. Booster 18 is preferably a hollow ring having openings that communicate into the interior of conduit 14. Booster 18 is provided with air under pressure by means of a supply conduit 18a having a control valve 18b therein. The purpose of booster 18 is to enhance the movement of the material through the conduit 14. Vessel 10 has a generally dome-shaped cover with a material inlet opening 20 therein. Mounted around and extending upwardly from opening 20 is a tubular inlet conduit 21 having a butterfly valve 22 mounted therein. The position of valve 22 is controlled by an air motor 23. Valve 22 is constructed to insure positive shut-off, both to prevent material from entering the tank and to prevent air under pressure from escaping from the tank.

Another opening is provided in the top of vessel 10 to permit air to escape from the vessel during the blending operation. Extending upwardly from this opening is a conduit 25 having at its upper end a hopper-like portion 26. A positive shut-off butterfly valve 27 operated by an air motor 28 is mounted in conduit 25. A suitable filter or screen (not shown) is mounted within hopper-like portion 26 to filter out material being carried by the air escaping therethrough during the blending operation. An electric motor 30 is mounted on hopper-like portion 26 and is provided with eccentric apparatus to continuously shake the filter during the blending operation. This continuous shaking of the filter causes the material being deposited thereon to break loose and fall back into vessel 10.

The inner walls of the upper portion 10a of tank 10 are free of equipment except for the access door 31 through which a man can enter the tank to service or repair the equipment mounted therein. The interior wall of lower portion 10b is provided with equipment designed to aerate, blend and aid in transporting materials carried by the tank. A plurality of aerator pads 38 are mounted at predetermined positions on the interior wall of lower portion 10b. Each aerator pad has a metal support frame, a wire mesh grid carried thereby, and a fabric diffuser mounted over the wire grid. Air enters each aerator pad through a threaded nipple that extends through an opening in the wall of lower portion 10b. In the embodiment shown, three horizontally spaced rows of aerator pads 38 are mounted around the interior wall of lower portion 10b. Thus, aerator pads 38 are generally equally spaced over the inner wall surface of lower portion 10b.

Positioned generally between each of the aerator pads 38 in the middle row are a group of jet nozzles 40. In the embodiment shown, a single jet nozzle 40 is mounted between each adjacent pair of aerator pads in the middle row. Thus, there are a total of eight jet nozzles 40 in the embodiment shown. Each jet nozzle 40 has a threaded lower portion for connection into an opening in the wall of tank 10 and each has an octagonal upper portion designed to permit easy threading of the nozzle into the opening and adjustment thereafter. Each jet nozzle has an air opening extending axially through the threaded portion and outwardly therefrom through one of the faces of the octagonal portion. Again, these jet nozzles are constructed and positioned in accordance with the teachings of the previously identified Mueller et al. application.

A pair of circular manifolds 45 and 46 are mounted around the exterior of tank 10 to provide air to the nozzles 40 and the pads 38. Each of the manifolds 45 and 46 is basically a circular pipe that extends almost completely around tank 10 and is sealed at both ends. The manifolds are supported from the upper portion 10a by means of vertically extending frame members 47 welded to the tank. Manifolds 45 and 46 are provided with separate supplies of air through pipes 48 and 49 respectively. A check valve is mounted in each of the pipes 48 and 49 to prevent reverse flow of air.

Manifold 45 is connected to each of the jet nozzles 40 by means of hoses and coupling members as shown somewhat schematically in the drawing. Therefore, all of the jet nozzles 40 will be provided with the same supply of air at the same pressure.

Manifold 46 is connected to each of the aerator pads 38 by means of similar flexible hoses and connectors, also shown schematically in the drawing. All of the aerator pads 38 will thus be supplied with the same source of air at the same pressure. The control system is disclosed schematically in the drawing. A source of air under pressure is provided through a pipe 53. Three different secondary pipes 54, 55 and 56 lead from the source 53 to the pipe 48 leading to upper manifold 45. A pair of secondary pipes 57 and 58 lead to pipe 49 connected to lower manifold 46. Another pair of secondary pipes 59 and 60 lead to pipe 15 supplying air to diffuser pad 13. Each of the secondary pipes 54–60 is provided with a pressure regulator valve shown schematically as having an adjustment handle and a pressure gauge. The secondary pipes are also provided with solenoid valves controlled from the control panel. Pipes 54, 55, 58 and 59 are each provided with separate check valves to prevent reverse air flow from the interconnected lines. A check valve is also mounted in conduit 15 adjacent diffuser pad 13. Another air supply conduit 61 is connected between pipes 59 and 60, and extends upwardly into an opening in the upper dome of vessel 10. The same air pressure that is applied to diffuser pad 13 is thus provided by conduit 61 into the upper portion of vessel 10 to equalize pressures across the diffuser pad canvas when the vessel is empty.

The air supply pipes 17a and 18a leading to the valve 17 and booster 18 are each provided with manual shut-off valves and with solenoid valves 17b and 18b controlled by the control panel. A pair of air supply control valves 62 and 63, controlling air to the air motors 23 and 28 respectively, are also activated and deactivated by the control panel.

Extending through the upper dome of vessel 10 is a liquid supply conduit 65. Conduit 65 is connected to a suitable source of liquid under pressure and is provided with a pressure regulator valve 66 and a control valve 67. The lower end of conduit 65 extends within the upper portion 10a of the tank 10 to a point near its center and is provided at its lower end with a nozzle 68. Nozzle 68 is a standard water spray or liquid spray nozzle that will provide a fine fog or mist to the material in the tank when water is supplied through it.

Pipe 65 is provided with a T connection between valve 67 and tank 10. Extending into the T connection is a secondary air pipe 69 connected to air supply 53. Pipe 69 is also provided with a pressure regulator valve and a control valve connected to the control panel. Pipe 69 provides air under pressure to conduit 65 that exits through nozzle 68 so that material in tank 10 does not enter and plug the nozzle 68 and conduit 65 when the water supply is shut off.

OPERATION

For best results, the tank is filled approximately one-half full so there is room for the aerated material to expand. During the filling operation, butterfly valves 22 and 27 are open. Air escapes through conduit 25 and motor 30 is energized to agitate the filter. Shut-off valve 17 is closed. The air supplies to the aerator pads 38 and the diffuser pad 13 are closed during the filling operation. However, the valve in line 55 is open to provide air at approximately 8–10 psi to manifold 45, which air continuously exits through nozzles 40 to prevent material from entering the open nozzles. The valve in line 69 is also open to keep the nozzle 68 free from material. This air entering the tank through nozzle 68 and nozzles 40, as well as the air being displaced by the materials, exits through conduit 25.

After the tank is filled to the desired level, the control system is shifted to the blending mode. In the blending mode, butterfly valve 22 is closed but butterfly valve 27 is left open to permit air to escape. Shut-off valve 17 remains closed. Two sources of air are provided to aerate or fluidize the material carried in the tank. First of all, air at approximately 12 psi is supplied through lines 60 and 15 to diffuser pad 13. This relatively low pressure air escapes from diffuser pad 13 over the entire surface of canvas 13b and moves upwardly through the material in tubular member 12 and through the material in lower portion 10b. This air from diffuser pad 13 fluidizes the material in the lower part of the tank and permits the material to be agitated by the jets as will be described. Fluidizing air also enters the tank through each of the aerator pads 38. This air is supplied from line 58 at approximately 12 psi. Because of the wide distribution of the aerator pads 38, this fluidizing air is supplied over a wide surface area of the material in the tank. The aerator pads 38 and diffuser pad 13, if used together in this manner, will fluidize the entire batch of material carried in the tank.

To actually stir or blend the material, manifold 45 is provided with intermittent high pressure air at approximately 80 psi from line 56. The solenoid valve in line 56 is opened and closed at predetermined intervals by means of a timer 63 operated by the control panel. Preferably, the valve in line 56 is cycled, three seconds open and three seconds closed. With this cycle, the jet nozzles 40 each provide a 3-second jet of air at approximately 80 psi every 3 seconds. As the jets are set at approximately a 45° angle with respect to the horizontal, these air jets cause the material to swirl and agitate in the tank. With some light materials, complete blending will take place in less than a minute. With other materials, it will take ten minutes or more to obtain complete blending. A few experimental runs with the equipment will tell the operator how long the blending operation should take for any given batch of materials.

After the blending cycle has started in the sense that the nozzles 40 are periodically energized with high pressure air, valve 67 is opened by the control panel to provide water or other liquid at a known pressure to nozzle 68. The water or other liquid thus sprays into the tank near the center thereof as a fine mist or fog that is immediately absorbed or collected by the swirling material in the tank. Because the material in the tank is swirling so rapidly, the water is immediately removed from the area adjacent nozzle 68 so that no water build-up problems occur. In addition, the material absorbs the water before it has a chance to contact the interior walls of the tank. The water spray is left on for a predetermined period of time during the blending cycle determined by the material being blended and the amount of water to be added. In any event, the water is always shut off before the blending cycle is terminated. After the water has been shut off, the blending cycle continues until complete mixing is achieved, at which time the valve in line 56 is closed to stop the high pressure pulsations through the jets 40. Air continues to be supplied at a lower pressure to the nozzles 40 by line 55, however, so that the nozzles will not plug.

After the blending and liquid treating of the material is completed, the system is shifted to a transport mode to transport the material from tank 10 through outlet conduit 14 to a remote location. In the transport mode, the butterfly valve 22 is kept closed and the butterfly valve 27 is also closed by the control panel. Both of these valves provide a positive seal so that air cannot escape from the system. At the same time, shut-off valve 17 is opened and booster 18 is energized. At this point, the only outlet from the tank for air or material is material outlet conduit 14.

In order to transport the material, it must be completely fluidized and subjected to pressure so that it will flow freely out through the valve 17 into conduit 14. To do this, the pressure in the tank is increased by closing the valve in line 60 and opening the valve in line 59 to provide air at approximately 30 psi through air supply conduit 15 into diffuser pad 13. Air at approximately 30 psi is also provided to the aerator pads 38 by means of secondary line 57. Air at approximately 30 psi is also provided to the jet nozzles 40 through secondary line 54. Line 59 also provides air at 30 psi to conduit 61 which is carried into the upper portion of tank 10. The material in the tank, which is being aerated by the diffuser pad 13 and aerator pads 38, is caused to swirl around the tank about its vertical axis by the nozzles 40 to aid in forcing the material from the tank through conduit 14. The pressure in the tank during the transport mode is normally held between 35 and 55 psi, depending upon the type of material in the tank and the operator's experience with that type of material. Transporting the material from the tank in this manner takes only a few minutes, making the system again available for filling with a new batch.

What is claimed is:

1. In a blender unit for discrete materials including a vessel having an upper portion with a material inlet opening therein and a generally conical lower portion converging downwardly from said upper portion to a material outlet opening at the bottom end thereof, a plurality of aerator pads mounted at predetermined positions on the interior wall of said conical lower portion, means for supplying a flow of air to said pads to aerate material carried in said vessel, a plurality of air jet nozzles mounted at predetermined positions on the interior wall of said conical lower portion, means for supplying intermittent high pressure air to said jet nozzles to agitate and blend the material in said vessel, and means associated with said material outlet opening to remove said blended material from said vessel; the improvement comprising means for spraying a liquid into said material in said vessel while it is being agitated and blended.

2. The blender unit of claim 1 wherein said means for spraying a liquid comprises a downwardly facing spray nozzle mounted near the center of said upper portion of said vessel.

3. A combination blender and transporter unit for powdered or granular materials, comprising:

a. a vessel having an upper portion with a closable material inlet opening therein and a lower portion converging downwardly from said upper portion to a material outlet opening at the bottom end thereof;
b. a plurality of aerator pads mounted at predetermined positions on the interior wall of said lower portion to aerate material carried in said vessel;
c. a plurality of air jet nozzles mounted at predetermined positions on the interior wall of said lower portion to intermittently supply high pressure air jets during blending to agitate and blend the material in said vessel;
d. a spray nozzle mounted near the center of said upper portion to spray a liquid mist into said material during blending; and
e. means mounted on said vessel at said material outlet opening to aid in blending said material and to subsequently transport said blended material from said vessel.

4. The apparatus of claim 3 wherein said means mounted at said outlet opening comprises diffuser pad means mounted between said material outlet opening and a material outlet conduit, wherein first means are provided to supply air to said diffuser pad means at a relatively low pressure during blending to aid in aerating and blending said material in said vessel, wherein second means are provided to alternately supply air to said diffuser pad means at a higher pressure to transport said blended material from said vessel into said outlet conduit, and wherein said first and second means are connected to a conduit leading into said upper portion to thereby equalize pressure across said diffuser pad.

5. A blender unit for discrete material, comprising:
a. a vessel having an upper portion with a material inlet opening therein, and a lower funnel-shaped portion having a material outlet opening at the bottom end thereof;
b. means for supplying a steady flow of air into said material along the walls of said funnel-shaped portion to aerate said material carried in said vessel;
c. means for introducing relatively high pressure jets of air into said material during blending to agitate and blend the material in said vessel; and
d. means for spraying a liquid mist directly into said agitated material in said tank while the blending is taking place.

6. A method of blending and treating discrete materials in a vessel having an upper portion with a closable material inlet opening therein and a lower portion converging downwardly from said upper portion to a material outlet opening at the bottom end thereof, and subsequently transporting said blended and treated materials from said vessel, comprising:
a. adding said materials to said vessel through said inlet opening;
b. closing said inlet and outlet openings;
c. aerating said materials in said vessel;
d. agitating and blending said aerated materials by introducing relatively high pressure jets of air into said materials;
e. treating said materials by spraying a liquid directly into said materials during blending; and
f. opening said material outlet opening after blending and treating is complete, closing all other vessel openings, and subjecting the interior of said vessel to relatively high air pressure to aerate said material and force the aerated material out through said material outlet opening.

7. A method of blending and treating a batch of discrete materials, comprising:
a. fluidizing said batch of materials by supplying a continuous flow of air at a first pressure to said materials over widely distributed areas thereof;
b. blending said fluidized materials by subjecting the materials to pulsating high pressure jets of air; and
c. spraying a liquid into said materials for a predetermined period while the blending is in progress.

* * * * *